June 13, 1933.                K. E. LUNDIN                 1,914,141
                         POWER TRANSMITTING DEVICE
                         Filed May 13, 1931        2 Sheets-Sheet 1

INVENTOR
KNUT E. LUNDIN

June 13, 1933. K. E. LUNDIN 1,914,141
POWER TRANSMITTING DEVICE
Filed May 13, 1931 2 Sheets-Sheet 2
FIG. 2
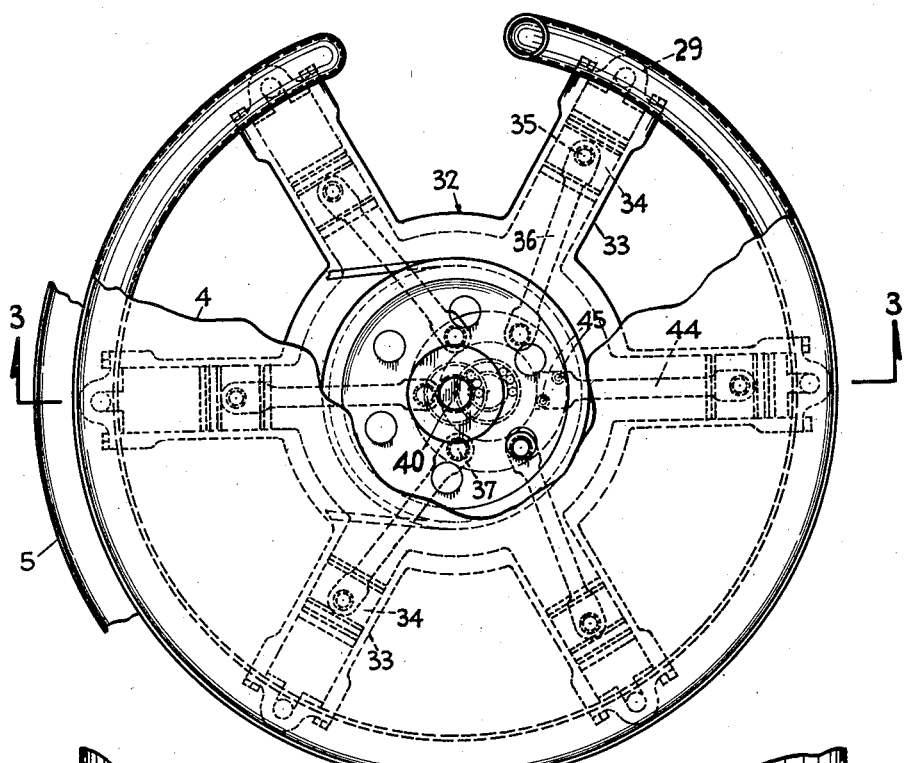
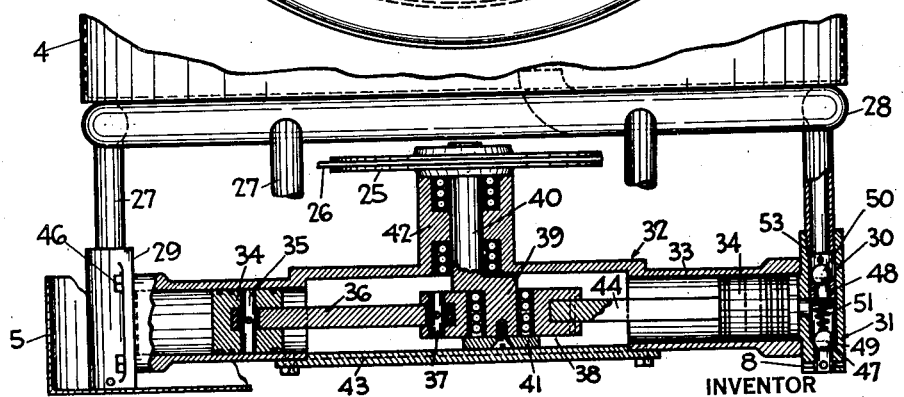
FIG. 3
INVENTOR
KNUT E. LUNDIN
BY
ATTORNEY Patented June 13, 1933

1,914,141

UNITED STATES PATENT OFFICE

KNUT E. LUNDIN, OF NATIONAL CITY, CALIFORNIA, ASSIGNOR OF ONE-FOURTH TO DAVID M. FETTERS, OF GALLUP, NEW MEXICO, AND ONE-THIRD TO CHRISTIAN S. B. KROHN, OF LOS ANGELES, CALIFORNIA

POWER TRANSMITTING DEVICE

Application filed May 13, 1931. Serial No. 537,007.

My improved invention relates to power transmitting devices, it being an important object of the invention to provide therein new and novel principles of construction wherein the power transmitting device medium comprises essentially the elements of a rotary pump, especially adapted for the application of power through both liquid and air pressure.

Another object is the incorporation of improved means for maintaining a constant pressure flow.

Still other objects of an advantageous nature may hereinafter appear.

With the foregoing and other objects in view, the invention resides in certain attained novel features of construction and combination of parts illustrated by way of preferment in two generic species in the accompanying drawings.

In the embodiments shown,

Fig. 2 is a plan view, parts being broken away to show underlying structure, said figure may be hereinafter alluded to as a preferred species; and, Fig. 3 is a part elevation and part sectional view the sectioned portions being taken on line 3—3 of Fig. 2.

Figure 1:
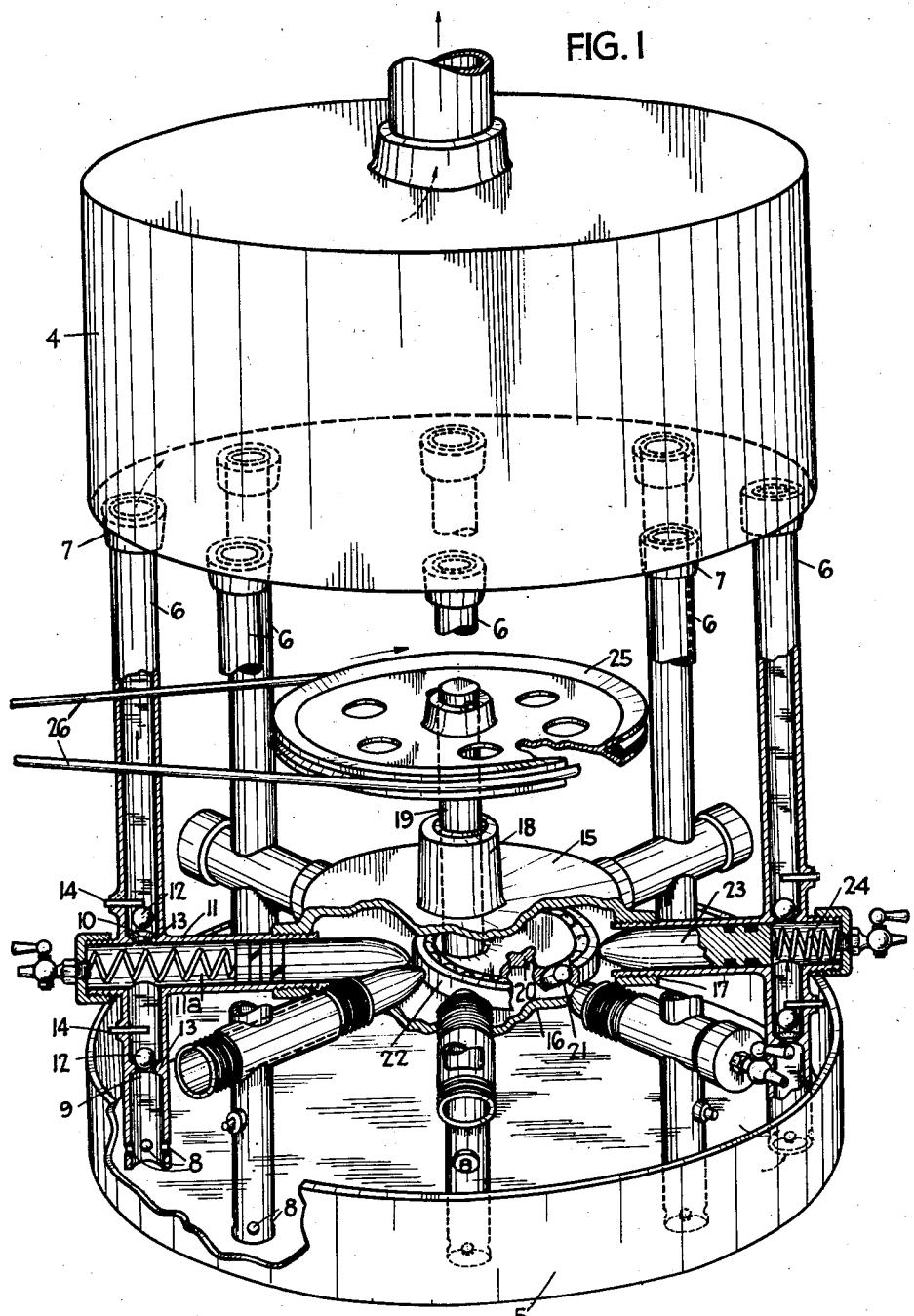
Fig. 1 is a perspective view setting forth the principles of the invention in its entirety.

In detail, there is shown a pressure storage tank 4, and a suction supply tank 5. Intercommunicating with these two tanks are a plurality of like pipe stanchions 6, said stanchions may set within the confines of the supply tank 5, or they may be suitably fastened thereto. These stanchions in turn are fastened to and form a support for the pressure tank into which the flow from said stanchions is directed.

The fastening of the stanchions to the pressure tank may be made by couplings 7 uniting the stanchions and the tank by first screwing each stanchion into its coupling and then welding the coupling to the tank, or any other suitable connection may be substituted. Another example will be hereinafter described with reference to the embodiment shown in Fig. 2.

Near the juncture of the stanchions and the supply tank 5 are formed in the former, a number of intake orifices 8, through which the liquid flows in its passage upwardly through the stanchion into the cylinders 11 and then into the pressure tank.

Referring to the drawings, there is shown two tanks, and circularly arranged tubular stanchions whereby one of said tanks is supported above the other. The stanchions independently communicate with both of said tanks, and there is provided separate pumping means for each stanchion whereby the fluid is pumped from the lower tank to the upper tank.

The crank case 15 is cast hollow and there is fastened to the case a bottom cover plate 16 whereby access is had thereinto. Spaced nipples 17 extend from the periphery of the crank case into which the pump cylinders 11 are screwed, the latter cylinders being cylindrical in form. The crank case 15 is provided with a hub 18 in which is journalled the driven shaft 19. To the latter shaft is keyed an eccentric 20 (see Fig. 1) and circumferizing said eccentric is a ball race 21, the outer band 22 circumferizing said race being of a material to resist wear. Against the outer face of said band abut the ogival ends of all the pump pistons 23, said pistons being slidable in the pump cylinders. The piston springs 24 oppose the action of the eccentric 20.

The eccentric 20 is so keyed to the shaft 19 and the shaft 19 is so positioned with respect to the crank case, that the tapered inner extremities only of the ogival ends of the pistons abut the band 22 at its mid-width.

The shaft 19 is driven by a driven pulley 25 and a driving belt 26 from any suitable source (not shown).

As the shaft 19 is rotated the springs 24 force the pistons 23 radially inward after they have been moved radially outward by the eccentric.

On the in-stroke of the pistons the suction valves are operated to allow fluid to pass therethrough into the cylinder chambers 11a and on the out-stroke the pistons force the fluid from said chambers through the outlet valves into the pressure tank, the balls in each instance after having performed their function gravitating to their seats.

As the fluid enters the tank 4 it is acted upon by the air cushion in the tank, and various pressures may be attained within the tank for whatever purpose desired.

The species in Figs. 2 and 3 will now be described.

The stanchion pipes 27 may be likened to the stanchion pipes 6 with respect to function. However they differ in some respects. The pipes 27 extend vertically upward into a bussle or manifold pipe 28 adapted to support the pressure tank 4. The end of the manifold pipe communicates with the bottom of said tank as shown. By connecting the outlets of the individual stanchion pipes with a common pipe having a single opening as shown by the construction in Fig. 2, a more uniform pressure is obtained at the bussle pipe orifice.

The stanchion pipes 27 are screwed into cylinder caps 29 wherefrom said pipes 27 are supported. Within the caps 29 are formed the suction and outlet valves 30 and 31.

The crank case and cylindrical pump chambers or piston housings of the alternate species are unitized into a single casting 32, and onto the machined extremities of the piston housings 33 are fastened the caps 29, as clearly indicated in the drawings.

These piston housings 33 extend radially from the peripheral portion of the crank case proper, and in said housing reciprocate the pistons 34. Onto each piston is pivotally fastened by means of a gudgeon 35, one end of the connecting rod 36. The other end of each rod 36 except as hereinafter noted is pivotally connected by a pivot pin 37 to the eccentrically operated cross-head disc 38. The disc 38 is ball-bearingly fastened to the crank 39 of the driven shaft 40 and retained in place by a plate 41 fastened to the end of the crank. The driven shaft 40 is ball-bearingly mounted in a hub 42 similar to the hub 18. To the bottom of the crank case is fastened a cover plate 43, whereby access is had to its interior. Within the interior of the case is provided a heavy grease or oil bath in which the parts operate.

There is one of the connecting rods, designated by the numeral 44, which is not pivotally connected to the disc 37. It is the master guide-connecting-rod which maintains the proper eccentricity of the remaining pins 37 with respect to their center of gyration. Said rod 44 is connected to the disc 37 by a pair of rivets 45.

The cylinder caps 29 are fastened to the ends of the cylinder housings by cap screws 46. The suction valve seats 47 are integrally formed therein, while the outlet valve seats 48 are pressed therein. Upon these seats rest the balls 49 and 50. In the lower portion of the caps are provided a plurality of orifices 8 as aforedescribed. The ball 49 in addition to being seated by gravity is assisted by a coil spring 51, the suction force overcoming the resistance of the spring in the suction stroke to depress the spring whereupon fluid may pass into the pump chamber. On the pressure stroke the ball 50 is lifted permitting the fluid to pass into the stanchion pipes and eventually into the pressure tank. On the pressure stroke the pins 53 limit the upward travel of the balls 50.

In the construction just described the action is positive and uniform.

I claim:

The combination with a pressure storage tank for storing a fluid under pressure and an open tap suction supply tank for supplying a fluid to said storage tank, of means comprising a circumferential pipe and a plurality of circularly arranged individual vertical pipe stanchions opening into said circumferential pipe for superposedly supporting said pressure storage tank and through which fluid from said suction tank to said pressure storage tank is separately conducted, a circular crank case housing including a detachable cover plate for enclosing said housing, a series of radiating cylinders outwardly directed from said housing, pistons in said cylinders for forcing fluid from one of said tanks through each of said stanchions one at a time to the other of said tanks, gravity operated ball inlet and outlet valves mounted in said stanchions for separately controlling the fluid into and out of said cylinders, and means for reciprocating said pistons whereby to entrain fluid from said suction tank into one of said stanchions and then into its cylinder, and then force it from said cylinder again into said stanchion and thence into said pressure storage tank, said means comprising a driven shaft having an offset crank arm, a cross-head disc detachably fastened to said arm, connecting rods pivotally connected to said pistons and said cross-head, there being one of said connecting rods constituting a master guide rod which is rigidly secured to said disc whereby to maintain the proper eccentricity of the pivotal connections of the remaining connecting rods and said disc with respect to their centers of gyration.

KNUT E. LUNDIN.